US007492360B2

(12) United States Patent
Yamashita et al.

(10) Patent No.: US 7,492,360 B2
(45) Date of Patent: Feb. 17, 2009

(54) IMAGE DISPLAY DEVICE WITH CIRCUITS TO COMPENSATE VOLTAGE DROP IN THE COMMON ELECTRODE FOR ACTIVE MATRIX LIQUID CRYSTAL DISPLAYS

(75) Inventors: Masakatsu Yamashita, Kobe (JP); Shuji Hagino, Kobe (JP); Masaru Yasui, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 548 days.

(21) Appl. No.: 10/526,420

(22) PCT Filed: Aug. 28, 2003

(86) PCT No.: PCT/IB03/03619

§ 371 (c)(1), (2), (4) Date: Mar. 1, 2005

(87) PCT Pub. No.: WO2004/023448

PCT Pub. Date: Mar. 18, 2004

(65) Prior Publication Data

US 2006/0007193 A1 Jan. 12, 2006

(30) Foreign Application Priority Data

Sep. 4, 2002 (JP) ............................ 2002-259454

(51) Int. Cl.
*G06F 3/038* (2006.01)

(52) U.S. Cl. ...................................... 345/204; 345/100

(58) Field of Classification Search ........... 345/87–104, 345/204, 211, 50–54

See application file for complete search history.

(56) References Cited

U.S. PATENT DOCUMENTS

| | | | | |
|---|---|---|---|---|
| 4,810,973 | A * | 3/1989 | Kurz | 330/129 |
| 5,307,084 | A * | 4/1994 | Yamaguchi et al. | 345/58 |
| 5,883,609 | A * | 3/1999 | Asada et al. | 345/100 |
| 5,926,162 | A * | 7/1999 | Wood et al. | 345/101 |

FOREIGN PATENT DOCUMENTS

EP 1 195 741 A2 4/2002

* cited by examiner

*Primary Examiner*—Chanh Nguyen
*Assistant Examiner*—Bao-Quan T Ho
(74) *Attorney, Agent, or Firm*—Birch, Stewart, Kolasch & Birch, LLP

(57) ABSTRACT

An image display device having a voltage supplying device generating a first changing voltage for setting a transistor to an on-state and a second changing voltage for setting a transistor to an off-state to operate so as to establish a first supply mode, a second supply mode and a third supply mode to a plurality of gate buses for determining the corrected common electrode voltage.

15 Claims, 6 Drawing Sheets

IMAGE DISPLAY DEVICE WITH CIRCUITS TO COMPENSATE VOLTAGE DROP IN THE COMMON ELECTRODE FOR ACTIVE MATRIX LIQUID CRYSTAL DISPLAYS

BACKGROUND OF THE INVENTION

1. Field of the Invention

The invention relates to an image display device comprising a plurality of gate buses, a plurality of source buses, transistors each of which for supplying a pixel electrode with a voltage from said source bus, a common electrode, and a corrected voltage supplying means for supplying said common electrode with a common electrode voltage which has been corrected by an amount of correction.

2. Description of Related Art

Prior to shipment of a liquid crystal display device, a voltage level on a common electrode is adjusted. For the purpose of the adjustment, the liquid crystal display device is provided with, for example, a variable resistor connected to the common and an adjustment knob for adjusting a resistance value of the variable resistor. The adjustment knob is manipulated by a person or machine, so that the voltage level on the common electrode is adjusted in such a way that a flicker level become minimized.

In the manner described above, since the variable resistor is required, there is a problem that a component cost of the resistor is required. Further, if the resistance value of the variable resistor is adjusted by a person, there is a problem that it is difficult to adjust the voltage level on the common electrode to an optimum level since positions of the adjusted adjustment knob vary among persons who adjust the adjustment knob, on the other hand, if the resistance value of the variable resistor is adjusted by a machine, there is a problem that an equipment cost is required since an equipment provided with photo sensors for receiving light emitted from a display panel and an adjustment system for adjusting the adjustment knob is required. Further, if the resistance value of the variable resistor is adjusted with the adjustment knob, the person or machine touches the adjustment knob and then manipulates the adjustment knob, so that there is a fear of occurring a slightly variation of the position of the adjustment knob at the instant when the person or machine releases the adjustment knob. Therefore, even if the adjustment knob is on the optimum position immediately before the person or machine releases the adjustment knob, there is a fear of occurring a slightly deviation of the position of the adjustment knob from the optimum position immediately after the person or machine releases the adjustment knob, so that it is difficult to adjust the voltage level on the common electrode to the optimum level.

It is an object of the invention is to provide an image display device in which the component cost and the equipment cost are reduced and a voltage level of a common electrode is easily adjustable to an optimum level.

SUMMARY OF THE INVENTION

A first image display device of the present invention for achieving the object described above comprises a plurality of gate buses, a plurality of source buses, transistors each of which for supplying a voltage from said source bus to a pixel electrode, a common electrode, and a corrected voltage supplying means for supplying said common electrode with a common electrode voltage which has been corrected by an amount of correction, wherein said corrected voltage supplying means comprising: a changing voltage generating means for generating a first changing voltage having changing voltage levels for setting said transistor to an on-state and a second changing voltage having changing voltage levels for setting said transistor to an off-state, said changing voltage generating means operating so as to establish at least three supply modes including a first supply mode, a second supply mode and a third supply mode, said first supply mode in which said first changing voltage is supplied to a first number of ones of said plurality of gate buses and said second changing voltage is supplied to a second number of ones of said plurality of gate buses, said second supply mode in which said first changing voltage is supplied to a third number of ones of said plurality of gate buses and said second changing voltage is supplied to a fourth number of ones of said plurality of gate buses or said first changing voltage is supplied to at least said third number of ones of said plurality of gate buses and said second changing voltage is not supplied to said plurality of gate buses, and said third supply mode in which said first changing voltage is supplied to a fifth number of ones of said plurality of gate buses and said second changing voltage is supplied to a sixth number of ones of said plurality of gate buses or said first changing voltage is not supplied to said plurality of gate buses and said second changing voltage is supplied to at least said sixth number of ones of said plurality of gate buses; and a corrected voltage generating means for detecting, each time each of said at least three modes is established, a voltage on said common electrode to determine said amount of correction on the basis of amounts of change in said detected voltages on said common electrode.

The first image display device comprises the changing voltage generating means and the corrected voltage generating means. The changing voltage generating means operates so as to establish at least three supply mode. The corrected voltage generating means detects a voltage on said common electrode each time each of said at least three modes is established, determines the amount of correction on the basis of amounts of change in the detected voltages, and supplies the common electrode with the common electrode voltage which has been corrected by the amount of correction. Such the changing voltage generating means and the corrected voltage generating means can be implemented without large-scale devices. Further, in the first image display device according to the present invention, since the common electrode voltage is corrected using the changing voltage generating means and the corrected voltage generating means described above, the equipment comprising photo sensors for receiving light from the panel and the adjustment system for manipulating the adjustment knob is not required, so that the common electrode voltage can be corrected without the expensive equipment cost.

In the first image display device according to the present invention, the corrected voltage supplying means corrects, by the amount of correction determined as described above, the common electrode voltage which is not yet corrected. Therefore, the variable resistor for correcting the common electrode voltage and the adjustment knob for adjusting the resistance value of the variable resistor are not required, so that the component cost are reduced. Further, since the adjustment knob is not required, there is no fear of occurring a deviation of the voltage level on the common electrode from the optimum level due to the slightly variation of the adjusted position of the adjustment knob immediately after releasing the adjustment knob, so that an accuracy of correction can be improved.

In the first image display device according to the present invention, it is preferable that said corrected voltage generating means comprises: an AD converting means for detecting, each time each of said at least three modes is established, said voltage on said common electrode as an analog voltage to convert said detected analog voltages into first digital signals; an operation means for determining amounts of change in said detected analog voltages from said first digital signals and determining said amount of correction on the basis of said determined amounts of change to output an digital signal representing said common electrode voltage which has been corrected by said determined amount of correction; a DA converting means for converting said digital signal outputted from said operation means into an analog voltage, and a switching means for switching between a first connection mode in which said common electrode is connected to said AD converting means and a second connection mode in which said common electrode is connected to said DA converting means.

By providing the corrected voltage generating means with the means described above, the amount of correction is determined and the common electrode is supplied with the common electrode voltage which has been corrected by the amount of correction.

In the first image display device according to the present invention, said corrected voltage generating means comprises a storing means for storing said corrected common electrode voltage represented by said digital signal outputted from said operation means, and wherein said DA converting means may convert said corrected common electrode voltage stored in said storing means into an analog voltage, instead of converting said digital signal outputted from said operation means into an analog voltage.

The common electrode can be supplied with the corrected common electrode voltage by also providing the corrected voltage generating means with the storing means as described above.

In the first image display device according to the present invention, said corrected voltage supplying means may comprise a predetermined voltage generating means for generating a predetermined voltage to supply said source bus with said predetermined voltage, and wherein said plurality of source buses may be supplied with said predetermined voltage in each of said at least three supply modes. In this case, it is preferable a constant voltage is generated as said predetermined voltage.

If the voltage supplied to the source bus is constant, the equation for determining the amount of correction can be expressed by a simple equation.

In the first image display device according to the present invention, it is preferable that said changing voltage generating means comprises: a plurality of output circuits, each of which provided for a respective one of said plurality of gate buses, for selectively outputting an on-voltage of a constant value for setting said transistor to an on-state and an off-voltage of a constant value for setting said transistor to an off-state; a signal generating circuits for generating a changing voltage signal which represents a predetermined changing voltage; and a plurality of adders, each of which provided for a respective one of said output circuits, for adding said predetermined changing voltage to said on-voltage when said on-voltage is outputted from the corresponding output circuit to output said first changing voltage, and for adding said predetermined changing voltage to said off-voltage when said off-voltage is outputted from the corresponding output circuit to output said second changing voltage.

The first and second changing voltages can be easily generated by adding the voltage represented by the changing voltage signal to the on-voltages or off-voltages outputted from the output circuits.

In the first image display device, it is preferable that said AD converting means detects said on-voltage and said off-voltage as an analog voltage and converts said detected analog voltage into a second digital signal, and wherein said operation means determines said amounts of change from said first digital signal and values of said on-voltage and said off-voltage from said second digital signal, and determines said amount of correction on the basis of said determined amounts of change and said determined values of said on-voltage and said off-voltage.

If the AD converting means is supplied with the on-voltage and the off-voltage, the difference between the on-voltage and the off voltage which is needed to determine the amount of correction can be accurately determined, so that the value of the corrected common electrode voltage can be accurately determined.

In the first image display device according to the present invention, said changing voltage generating means may operate so as to establish said at least three supply modes when a power supply of said image display device is turned from off to on, or may operate so as to periodically establish said at least three supply modes under e the condition that an power supply of said image display device is in an on-state.

The at least three supply modes can be established, for example, at the timing described above.

In the first image display device according to the present invention, it is preferable that said at least three supply modes consists of only said first, second and third supply modes, wherein said second supply mode is a mode in which said first changing voltage is supplied to all of said plurality of gate buses, and wherein said third supply mode is a mode in which said second changing voltage is supplied to all of said plurality of gate buses.

If the second and third supply modes are defined as modes described above, the equation for determining the amount of correction can be expressed by a simple equation.

A second image display device of the present invention comprises a plurality of gate buses, a plurality of source buses, transistors each of which for supplying a pixel electrode with a voltage from said source bus, a common electrode, and a corrected voltage supplying means for supplying said common electrode with a common electrode voltage which has been corrected by an amount of correction, wherein said corrected voltage supplying means comprising: a changing voltage generating means for generating a first changing voltage having changing voltage levels for setting said transistor to an on-state and a second changing voltage having changing voltage levels for setting said transistor to an off-state, said changing voltage generating means operating so as to establish at least three supply modes including a first supply mode, a second supply mode and a third supply mode, said first supply mode in which said first changing voltage is supplied to a first number of ones of said plurality of gate buses and said second changing voltage is supplied to a second number of ones of said plurality of gate buses, said second supply mode in which said first changing voltage is supplied to a third number of ones of said plurality of gate buses and said second changing voltage is supplied to a fourth number of ones of said plurality of gate buses or said first changing voltage is supplied to at least said third number of ones of said plurality of gate buses and said second changing voltage is not supplied to said plurality of gate buses, and said third supply mode in which said first changing voltage is supplied to a fifth number of ones of said plurality of gate buses and said second changing voltage is supplied to a sixth number of ones of said plurality of gate buses or said first changing voltage is not supplied to said plurality of gate buses and said second changing voltage is supplied to at least said sixth number of ones of said plurality of gate buses; a first detection terminal for detecting a voltage on said common electrode each time each of said at least three modes is established; a storing means for storing said corrected common electrode voltage which is determined on the basis of amounts of change in said detected voltages on said common electrode through said first detection terminal; and a DA converting means supplied with said corrected common electrode voltage stored in said storing means as a digital signal, said DA converting means converting said supplied digital signal into an analog voltage and outputting said analog voltage to said common electrode.

The second image display device comprises, just as in the case of the first image display device, the changing voltage generating means for establishing the at least three supply modes in order to determine the corrected common electrode voltage. The changing voltage generating means for establishing such supply modes can be implemented without large-scale devices. Further, the a voltage on said common electrode is detected through the first detection terminal and the detected voltage is supplied to a corrected voltage determining device which is prepared as a different device from the second image display device. The corrected voltage determining device determines the corrected common electrode voltage on the basis of an amount of change in the voltage on the common electrode. The corrected common electrode voltage is stored in the storing means of the second image display device. Therefore, the second image display device according to the present invention dose not determine the corrected common electrode voltage by the operation of only second image display device, but determines the corrected common electrode voltage in cooperation with the corrected voltage determining device prepared as a different device from the second image display device. That is to say, the corrected voltage determining device in addition to the second image display device is required to determine the corrected common electrode voltage. However, it is possible to implement the corrected voltage determining device without a large-scale device. Therefore, when the common electrode voltage is corrected, the equipment comprising photo sensors for receiving light from the panel and the adjustment system for manipulating the adjustment knob is not required, so that the common electrode voltage can be corrected without the expensive equipment cost.

In the second image display device according to the present invention, the variable resistor and the adjustment knob are not required just as with the case of the first image display device according to the present invention, so that the component cost are reduced and an accuracy of correction can be improved.

In the second image display device according to the present invention, it is preferable that said corrected voltage generating means comprises an switching means for switching between a first connection mode in which said common electrode is connected to said first detection terminal and a second connection mode in which said common electrode is connected to said DA converting means.

In the second image display device according to the present invention, said corrected voltage supplying means may comprise a predetermined voltage generating means for generating a predetermined voltage to supply said source bus with said predetermined voltage, and wherein said plurality of source buses may be supplied with said predetermined voltage in each of said at least three supply modes. In this case, it is preferable a constant voltage is generated as said predetermined voltage.

In the second image display device according to the present invention, it is preferable that said changing voltage generating means comprises: a plurality of output circuits, each of which provided for a respective one of said plurality of gate buses, for selectively outputting an on-voltage of a constant value for setting said transistor to an on-state and an off-voltage of a constant value for setting said transistor to an off-state; a signal generating circuits for generating a changing voltage signal which represents a predetermined changing voltage; and a plurality of adders, each of which provided for a respective one of said output circuits, for adding said predetermined changing voltage to said on-voltage when said on-voltage is outputted from the corresponding output circuit to output said first changing voltage, and for adding said predetermined changing voltage to said off-voltage when said off-voltage is outputted from the corresponding output circuit to output said second changing voltage.

In the second image display device according to the present invention, it is preferable that said at least three supply modes consists of only said first, second and third supply modes, wherein said second supply mode is a mode in which said first changing voltage is supplied to all of said plurality of gate buses, and wherein said third supply mode is a mode in which said second changing voltage is supplied to all of said plurality of gate buses.

DESCRIPTION OF THE PREFERRED EMBODIMENT(S)

Figure 1:
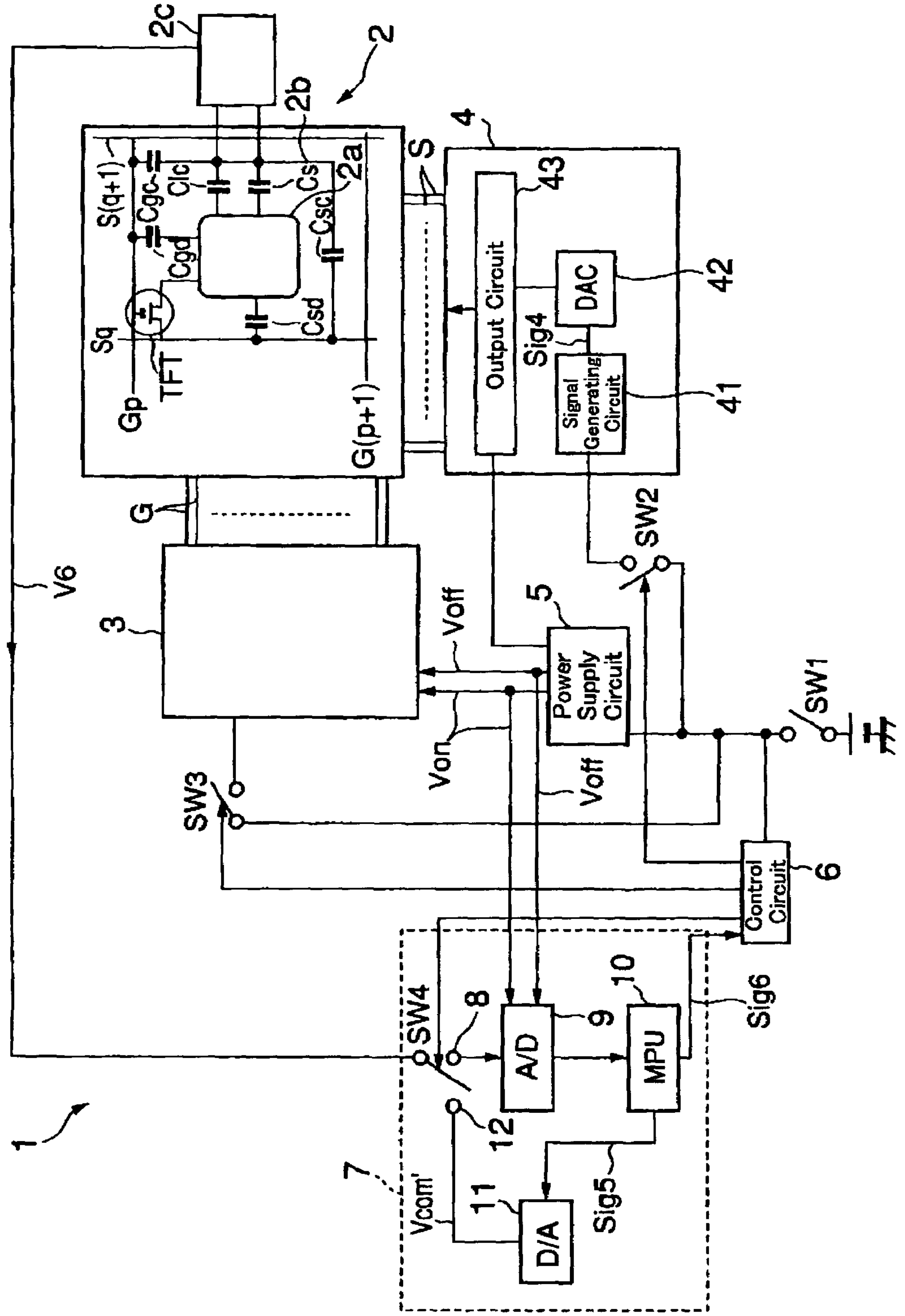
FIG. 1 is a block diagram of a mobile phone 1 which is one example of the image display device of a first embodiment according to the present invention.

FIG. 1 is a block diagram of a mobile phone 1 which is one example of the image display device of a first embodiment according to the present invention.

The mobile phone 1 comprises a liquid crystal panel 2, a gate driver 3, a source driver 4, a corrected voltage generating circuit 7 and others. Each time a power supply of the mobile phone 1 is turned on, the mobile phone 1 determines an amount of correction ΔVcom for a common electrode voltage Vcom and corrects the common electrode voltage Vcom by the determined amount of correction ΔVcom to generate a corrected common electrode voltage Vcom'. Hereinafter, a principle of the mobile phone 1 for determining the amount of correction ΔVcom in the first embodiment is described with reference to FIGS. 2 to 5 and, as needed, FIG. 1.

In the liquid crystal panel 2 shown in FIG. 1, one pixel is schematically illustrated as a representative of a plurality of pixels which are provided within the liquid crystal panel 2 and arranged in the form of a matrix. In the liquid crystal panel 2, a pixel electrode 2*a*, a p-th gate bus Gp and a (p+1)-th gate bus G(p+1), a q-th source bus and a (q+1)-th source bus S(q+1), a Cs line 2*b*, the common electrode 2*c* and TFT (Thin Film Transistor) are illustrated. The Cs line 2*b* is illustrated in FIG. 1 with the Cs line 2*b* connected to the common electrode 2*c* and a voltage supplied to the Cs line 2*b* is the same as a voltage supplied to the common electrode 2*c*. The pixel electrode 2*a* opposes the common electrode 2*c* through the medium of a liquid crystal layer (not shown), but the common electrode 2*c* is illustrated outside the liquid crystal panel 2 in FIG. 1 for the sake of convenience.

Various capacitances exist among the gate buses G, the source buses S, the common electrode 2*c* and the pixel electrodes 2*a*. For example, a capacitance Cgd exists between the pixel electrode 2*a* and the gate bus Gp, a capacitance Csd exists between the pixel electrode 2*a* and the source bus Sq, a capacitance Cgc exists between the Cs line 2*b* and the gate bus Gp, a capacitance Csc exists between the Cs line 2*b* and the source bus Sq, a capacitance Cs exists between the pixel electrode 2*a* and the Cs line 2*b*, and a capacitance Clc exists between the pixel electrode 2*a* and the common electrode 2*c*. In addition to the capacitances illustrated in FIG. 1, there exists, for example, a stray capacitance between the source bus and the gate bus, but the capacitances other than capacitances illustrated in FIG. 1 are not illustrated because of being negligible for the determination of the amount of correction ΔVcom.

Figure 2:
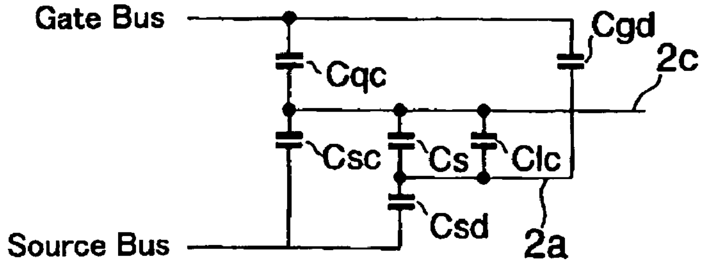
FIG. 2 shows the equivalent circuit in which all pixels within the liquid crystal panel 2 are considered as one pixel.

The capacitances Cgd, Csd, Cgc, Csc, Cs, and Clc described above exist in each pixel, but if all pixels within the liquid crystal panel 2 are considered as one pixel, the equivalent circuit of the one pixel can be considered as shown in FIG. 2. In FIG. 2, the pixel electrode 2*a* and the common electrode 2*c* are simplified in order to visually clear the connection relationship among the capacitances Cgd, Csd, Cgc, Csc, Cs, and Clc.

During a normal mode for displaying an image on the liquid crystal panel 2, the gate buses G are scanned sequentially. In the case, each gate bus G is supplied with an on-voltage Von for setting the TFT to an on state only during a scanning period and is supplied with an off-voltage Voff for setting the TFT to an off state during a period other than the scanning period. If the voltage supplied to each gate bus G changes from the on-voltage Von to the off-voltage Voff, the common electrode voltage Vcom changes by ΔVcom due to an amount of change Vd (=Von−Voff) in voltage supplied to the gate bus G. The ΔVcom can be expressed by an equation (1) using the Vd (=Von−Voff).

$$\Delta Vcom = Vd * \frac{Cgd}{Cs + Clc + Cgd} \tag{1}$$

In the equation (1), the polynomial Cs+Clc+Cgd of the denominator may be replaced by Cs+Clc+Cgd+Csd, but it is noted that the term Csd is neglected in the equation (1) since the Csd is well smaller than the Cs and Clc.

As described above, the common electrode voltage Vcom changes by ΔVcom when the voltage supplied to each gate bus G changes from the on-voltage Von to the off-voltage Voff. Such a voltage variation of the common electrode voltage Vcom may degrade the image displayed on the liquid crystal panel 2, so that it is required to correct the common electrode voltage Vcom by the ΔVcom. Viewing the equation (1), the Vd is a known value (=Von−Voff), so that it is possible to determine the ΔVcom if the Cd, Cs, and Clc can be known. From this viewpoint, the inventor has come up with a method of determining the ΔVcom. The principle for determining the ΔVcom is described below.

First, the state (a), (b), and (c) described below will be examined in this order under the condition that the source buses S are supplied with a constant voltage (in the states (a), (b) and (c), 'n' stands for the total number of the gate buses G shown in FIG. 1):

(a) a first state in which the on-voltage Von for setting the TFT to the on state is supplied to m gate buses (0<m<n) of n gate buses and the off-voltage Voff for setting the TFT to the off state is supplied to the remaining (n−m) gate buses (the ratio of m to n is, for example, 1 to 1)

(b) a second state in which the on-voltage Von is supplied to all of n gate buses G; and (c) a third state in which the off-voltage Voff is supplied to all of n gate buses G.

Figure 3:
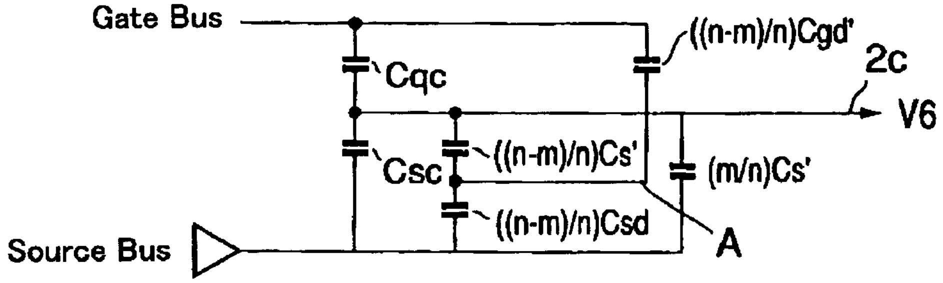
FIG. 3 shows the equivalent circuit in which the on-voltage Von is supplied to m gate buses (0<m<n) of n gate buses and the off-voltage Voff is supplied to the remaining (n−m) gate buses.

In the case of the first state (a), the equivalent circuit of FIG. 2 is modified to the equivalent circuit shown in FIG. 3. In FIG. 3, a capacitance Cs' means a sum capacitance (=Cs+Clc) of the capacitances Cs and Clc shown in FIG. 2.

If voltages on all gate buses G in the first state (a) change by ΔVg in such a way that the TFTs supplied with the changed voltage from the respective one of m gate buses G are kept on states and that the TFTs supplied with the changed voltage from the respective one of the remaining (n−m) gate buses G are kept off states, an equation (2) holds on the basis of the charge conservation law.

$$Cgc(\Delta Vcom1 - \Delta Vg) + (Csc + Cs')\Delta Vcom1 - \frac{n-m}{n}Cs'(Vx2 - Vx1) = 0 \tag{2}$$

where the ΔVcom1 is an amount of change in the voltage on the common electrode 2*c* obtained by changing the voltages on all gate buses G in the first state (a) by ΔVg, the Vx1 is a voltage on node A before the voltages on all gate buses G in the first state (a) change by ΔVg, and the Vx2 is a voltage on node A after the voltages on all gate buses G in the first state (a) change by ΔVg.

An equation (3) holds on the basis of the charge conservation law at the node A and an equation (3)' is derived from the modification of the equation (3).

$$\frac{n-m}{n}Cs'\{(Vx2 - Vx1) - \Delta Vcom1\} + \frac{n-m}{n}Csd(Vx2 - Vx1) + \frac{n-m}{n}Cgd\{(Vx2 - Vx1) - \Delta Vg\} = 0 \tag{3}$$

$$(Vx2 - Vx1) = \frac{Cs'\Delta Vcom1 + \Delta Vg \cdot Cgd}{Cs' + Csd + Cgd} \tag{3'}$$

Figure 4:
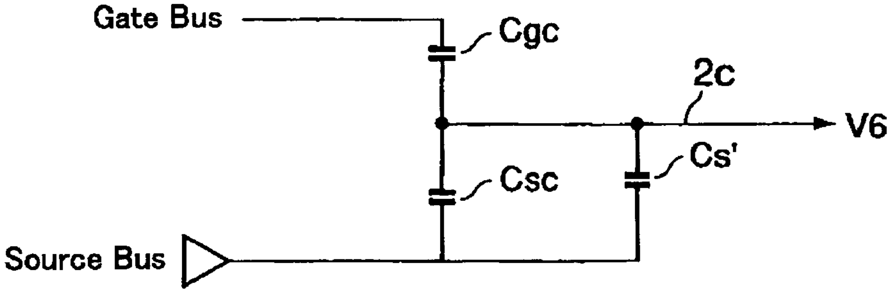
FIG. 4 shows the equivalent circuit in which the on-voltage Von is supplied to all of n gate buses.

Next, the second state (b) is examined below. The supply of the on-voltage to all of n gate buses G corresponds to the substitution of n for m (i.e. m=n) in FIG. 3. If m=n, the equivalent circuit shown in FIG. 3 is simplified as shown in FIG. 4.

If voltages on all gate buses G in the second state (b) change by ΔVg in such a way that the TFTs supplied with the changed voltage from the respective one of all gate buses G are kept on states, an equation (4) holds on the basis of the charge conservation law.

$$Cgc(\Delta Vcom2-\Delta Vg)+(Csc+Cs')\Delta Vcom2=0 \tag{4}$$

where the ΔVcom2 is an amount of change in the voltage on the common electrode 2*c* obtained by changing the voltages on all gate buses G in the second state (b) by ΔVg. The equation (4) is derived by substituting n for m and replacing the ΔVcom1 by the ΔVcom2 in the equation (2).

Figure 5:
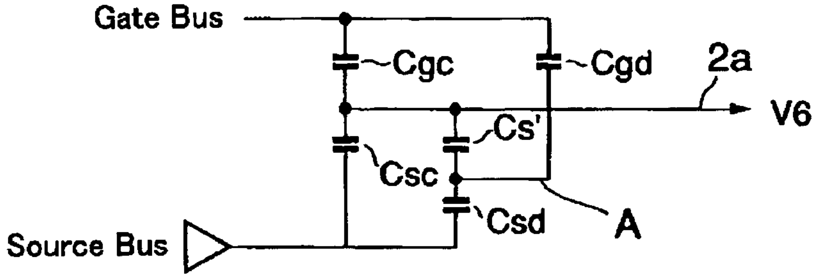
FIG. 5 shows the equivalent circuit in which the off-voltage Voff is supplied to all of n gate buses.

Next, the third state (b) is examined below. The supply of the off-voltage Voff to all of n gate buses G corresponds to the substitution of zero for m (i.e. m=0) in FIG. 3. If m=0, the equivalent circuit shown in FIG. 3 is simplified as shown in FIG. 5.

If voltages on all gate buses G in the third state (c) change by ΔVg in such a way that the TFTs supplied with the changed voltage from the respective one of all gate buses G are kept off states, an equation (5) holds on the basis of the charge conservation law.

$$Cgc(\Delta Vcom3-\Delta Vg)+(Csc+Cs')\Delta Vcom3-Cs'(Vx4-Vx3)=0 \tag{5}$$

where the ΔVcom3 is an amount of change in the voltage on the common electrode 2*c* obtained by changing the voltages on all gate buses G in the third state (c) by ΔVg, the Vx3 is a voltage on node A before the voltages on all gate buses G in the third state (c) change by ΔVg, and the Vx4 is a voltage on node A after the voltages on all gate buses G in the third state (c) change by ΔVg. The equation (5) is derived by substituting zero for n and replacing the ΔVcom1 by the ΔVcom3 in the equation (2).

An equation (6) holds on the basis of the charge conservation law at the node A and an equation (6)' is derived from the modification of the equation (3).

$$Cs'\{(Vx4-Vx3)-\Delta Vcom3\}+Cgd\{(Vx4-Vx3)-\Delta Vg\}+Csd(Vx4-Vx3)=0 \tag{6}$$

$$(Vx4-Vx3)=\frac{Cs'\Delta Vcom3+\Delta Vg\cdot Cgd}{Cs'+Cgd+Csd} \tag{6'}$$

The ratio of the Cgd to the Cs' is derived as an equation (7) from the equations (2) to (6)'.

$$\frac{Cgd}{Cs'}=\frac{\left(\begin{array}{c}-(\Delta Vcom1-\Delta Vcom2)\Delta Vcom3+\\ \frac{n-m}{n}(\Delta Vcom3-\Delta Vcom2)\Delta Vcom1\end{array}\right)}{\left(\begin{array}{c}\Delta Vg(\Delta Vcom1-\Delta Vcom2)-\\ \frac{n-m}{n}(\Delta Vcom3-\Delta Vcom2)\Delta Vg\end{array}\right)} \tag{7}$$

An equation (8) is derived from the equations (10 and(7).

$$\Delta Vcom=Vd*\frac{-(\Delta Vcom1-\Delta Vcom2)\Delta Vcom3+\frac{n-m}{n}(\Delta Vcom3-\Delta Vcom2)\Delta Vcom1}{(\Delta Vcom1-\Delta Vcom2)(\Delta Vg-\Delta Vcom3)+\frac{n-m}{n}(\Delta Vcom3-\Delta Vcom2)(\Delta Vcom1-\Delta Vg)} \tag{8}$$

In this way, the ΔVcom can be defined as functions of the Vd, ΔVg, ΔVcom1, ΔVcom2, and ΔVcom3. The Vd is Von−Voff. The ΔVg is the amount of change in the voltage supplied to the gate bus G. The ΔVcom1, ΔVcom2, and ΔVcom3 are the amounts of change in the common electrode voltage obtained by changing the voltages on all gate buses G in the states (a), (b) and (c) by ΔVg respectively. The Vd is the known value since the Vd is Von−Voff. The ΔVg is an arbitrarily definable value. Therefore, the Vd and ΔVg can be known in advance. As a result of this, it is possible to calculate the ΔVcom from the equation (8) if the ΔVcom1, ΔVcom2 and ΔVcom3 are determined. From this viewpoint, the inventor determines the ΔVcom1, ΔVcom2 and ΔVcom3 from the change of the voltages on all gate buses G in the states (a), (b) and (c) by ΔVg respectively, and then calculates the amount of correction ΔVcom on the basis of the determined ΔVcom1, ΔVcom2 and ΔVcom3.

For the purpose of obtaining the equation (8) of the ΔVcom in the example described above, a combination of three voltage supplying states has been examined by changing the voltages on the gate buses G in the state (a), (b) and (c) by ΔVg (The three voltage supplying states means that an on-off mixed state, an all-on state, and all-off state. The on-off mixed state means that the on-voltages Von on the m gate buses G in the first state (a) change by ΔVg and the off-voltages Voff on the remaining (n−m) gate buses G in the first state (a) change by ΔVg. The all-on state means that the on-voltages Von on all of n gate buses G in the second state (b) change by ΔVg. The all-off state means that the off-voltages Voff on all of n gate buses G in the third state (c) change by ΔVg). However, in the present invention, it is noted that the equation for determining the amount of correction ΔVcom can be expressed by an equation other than the equation (8) if a combination of three or more voltage supplying states having different ratios (m:n−m) is considered ('m' stands for the number of the gate buses supplied with the on-voltage Von and 'n−m' stands for the number of the gate buses supplied with the off-voltage Voff). For example, if four voltage supplying states in which the ratios (m; n−m) are 1:1, 1:2, 1:3 and 1:4 respectively are considered, it is possible to express the amount of correction ΔVcom as functions of four amounts of change ΔVcom1', ΔVcom2', ΔVcom3' and ΔVcom4' (where the ΔVcom1', ΔVcom2', ΔVcom3' and ΔVcom4' stand for amounts of change in the voltages on the common electrode 2*c* under the condition of the four voltage supplying states respectively). However, it is noted that, in this example, not only 'm' and 'n−m' greater than zero but also 'n−m' equal to zero (i.e. m:n−m is 1:0, which means that all of n gate buses are supplied with the on-voltage) and 'm' equal to zero (i.e. m:n−m=0:1, which means that all of n gate buses are supplied with the off-voltage) are used as the values of 'm' and 'n−m' for the reason that the equation for determining the ΔVcom can be easily derived. Hereinafter, it is described how to determine the term ΔVcom1, Δ Vcom2, and ΔVcom3 of the obtained equation (8) of the ΔVcom.

Figure 6:
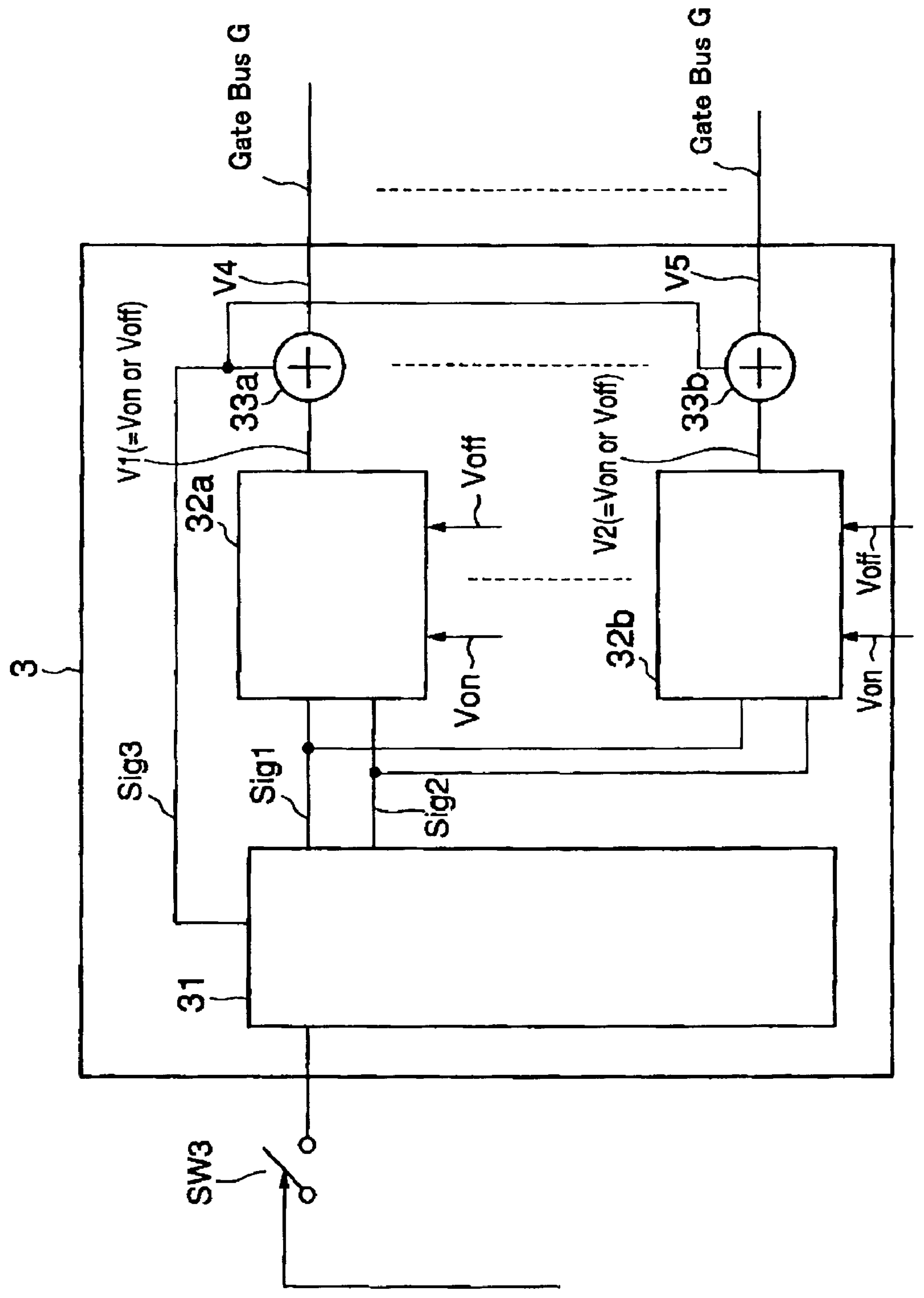
FIG. 6 is a schematically view of the gate driver 3 shown in FIG. 1.
Figure 7:
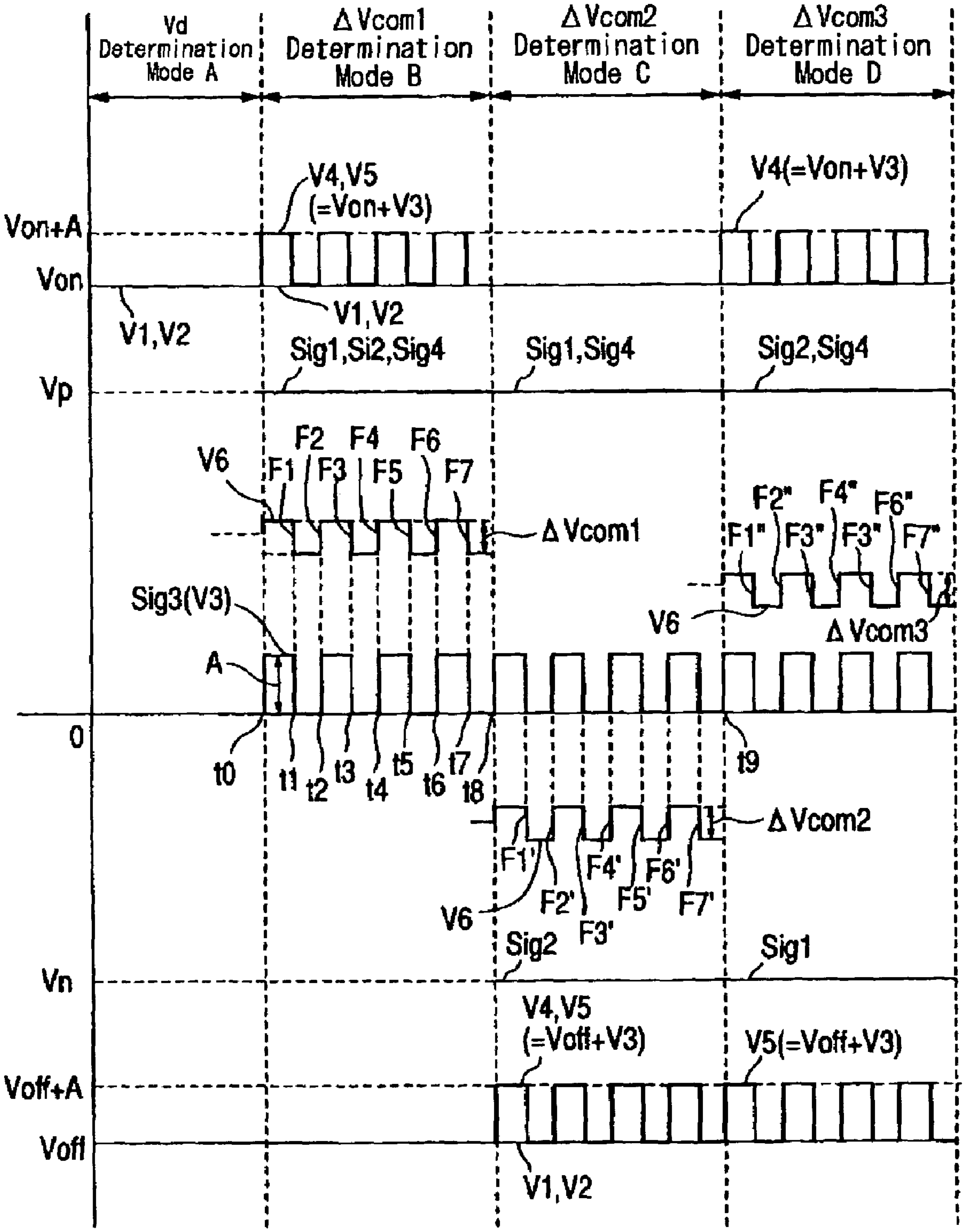
FIG. 7 is a timing chart of the mobile phone 1 for determining the corrected common electrode voltage Vcom'.

FIG. 6 is a schematically view of the gate driver 3 shown in FIG. 1. FIG. 7 is a timing chart of the mobile phone 1 for determining the corrected common electrode voltage Vcom'.

When the powered-off mobile phone 1 is turned on, the switch SW1 is closed. The time when the switch SW1 is closed is defined as t=0. In the mobile phone 1, after the switch SW1 is closed, a correction mode for correcting the common electrode voltage Vcom supplied to the common electrode 2*c* is established prior to a normal mode for displaying the image on the liquid crystal panel 2. In the correction mode, a Vd determination mode A is first established. In the Vd determination mode A, a power supply circuit 5 for driving a liquid crystal material generates the on-voltage Von for setting the TFT to the on state and the off-voltage Voff for setting the TFT to the off state as analog voltages. The voltages Von and Voff are supplied to the gate driver 3 (corresponding to "changing voltage generating means" in the present invention) and also supplied to an AD converting circuit 9. In the correction mode, the Vd in the equation (8) is determined prior to the ΔVcom1, Δ Vcom2, and ΔVcom3 in the equation (8). In order to determine the Vd, the AD converting circuit 9 converts the supplied on-voltage Von and off-voltage Voff into digital signals to supply a micro processing unit (MPU) 10 with the digital signals. The MPU 10 determines, on the basis of the supplied digital signals, the Vd (=Von−Voff) of the equation (8) voltage which is needed to determine the amount of correction ΔVcom for the common electrode voltage Vcom, and stores the determined value Vd. In this way, the Vd is determined in the Vd determination mode A.

In the Vd determination mode A, the on-voltage Von and off-voltage Voff from the power supply circuit 5 are also supplied all output circuits 32*a* and 32*b* (see FIG. 6) of the gate driver 3. The gate driver 3 comprises the output circuit corresponding to each gate bus G, but only two output circuits 32*a* and 32*b* are illustrated in FIG. 6 as representatives. The output circuit 32*a* (32*b*) is adapted to output one of the supplied voltage Von and Voff to the corresponding adder 33*a* (33*b*) as a voltage V1 (V2). In the Vd determination mode A, the output circuit 32*a* (32*b*) outputs the on-voltage Von to the corresponding adder 33*a* (33*b*) as the voltage V1 (V2), and the on-voltage Von is supplied from the adder 33*a* (33*b*) to the corresponding gate bus G. It is noted that the switch SW4 is opened in the Vd determination mode A, so that a voltage V6 from the common electrode 2*c* is not supplied to the AD converting circuit 9.

After the Vd determination mode A, a ΔVcom1 determination mode B for determining the ΔVcom1 is established as shown in the timing chart of FIG. 7. In the ΔVcom1 determination mode B, it is required to set the TFTs in the liquid crystal panel 2 to the on state. For this purpose, a control circuit 6 controls the switches SW2, SW3 and SW4 in su-ch a way that the switches SW2 and SW3 are closed and the switch SW4 is closed at the side of a terminal 8. When the switch SW3 is closed, a signal generating circuit 31 (see FIG. 6) of the gate driver 3 generates signals Sig1 and Sig2 for determining whether the TFT is set to the on state or not. In the ΔVcom1 determination mode B, both the signals Sig1 and Sig2 represent positive voltages Vp (see the timing chart of FIG. 7). Therefore, the signals Sig1 and Sig2 representing the positive voltages Vp are supplied to each output circuit 32*a* (32*b*). When both the voltages of the signals Sig1 and Sig2 are the positive voltages Vp, all output circuits 32*a* (32*b*) output the Von of the voltages Von and Voff to the corresponding adders 33*a* (33*b*) as the voltages V1 (V2) (see the timing chart of FIG. 7). The signal generating circuit 31 generates a signal Sig3 representing a voltage V3 of amplitude A (see the timing chart of FIG. 7) in addition to the Signals Sig1 and Sig2 and supplies the signal Sig3 to all of the adders 33*a* and 33*b* in ΔVcom1 determination mode B. Therefore, each adder 33*a* (33*b*) is supplied with the on-voltage Von from the output circuit 32*a* (32*b*) and the signal Sig3 from the signal generating circuit 31. The adder 33*a* (33*b*) adds the voltage V3 of the signal Sig3 to the on-voltage Von to output the voltage Von+V3 as the voltage V4 (V5) (see the timing chart of FIG. 7). The voltage V4 (V5) changes between a minimum voltage Von and a maximum voltage Von+A during the ΔVcom1 determination mode B. The voltage V4 (V5) outputted from the adder 33*a* (33*b*) is supplied to the corresponding gate bus G.

As described above, not only the switch SW3 but also switch SW2 are closed by the control circuit 6 in the ΔVcom1 determination mode B. When the switch SW2 is closed, the signal generating circuit 41 of the source driver 4 generates a signal Sig4 for controlling the DAC 42 in such a way that the DAC 42 outputs a signal of a zero voltage, so that the signal Sig4 is supplied to the DAC 42. In this embodiment, the voltage of the signal Sig4 is a Vp (see timing chart of FIG. 7), but the voltage of the signal Sig4 may be the other voltage than the Vp. The DAC 42 generates the zero voltage in response to the signal Sig4 to supply the output circuit 43 with the zero voltage. The output circuit 43 outputs the supplied zero voltage to each source bus S. In this embodiment, each source bus S is supplied with the zero voltage from the DAC 42, but alternatively may be supplied with a voltage having the other constant value than zero. Further, each source bus S may be supplied with a changing voltage instead of the constant voltage, but if the ΔVcom1 is determined by supplying each source bus with the changing voltage, the equation for determining the amount of correction ΔVcom is more complex than the equation (8), so that it is preferable that the source bus S is supplied with the constant voltage.

By supplying the voltages to the gate buses G and the source buses S as described above, the changing voltage V4 (V5) is supplied to the gate buses G and the constant voltage (zero voltage) is supplied to the source buses S in the ΔVcom1 determination mode B. Therefore, on the basis of the equivalent model shown in FIG. 4, an analog voltage V6 determined by a capacitive division is outputted from the common electrode 2*c*. As shown in FIG. 7, the voltages V4 (V5) supplied to the gate buses G change in the ΔVcom1 determination mode B, so that the analog voltage V6 outputted from the common electrode 2*c* also changes accordingly. The amount of change ΔVcom1 in the analog voltage V6 of the ΔVcom1 determination mode B corresponds to the ΔVcom1 of the equation (8). In order to determine the ΔVcom1, the analog voltage V6 is supplied to the corrected voltage generating circuit 7. The analog voltage V6 supplied to the corrected voltage generating circuit 7 is detected at the AD converting circuit 9 through the switch SW4. The AD converting circuit 9 converts the detected analog voltage V6 into a digital signal to supply the digital signal to the MPU 10. The MPU 10 determines the amount of change ΔVcom1 from the supplied digital signal. For example, if the unit 10 determines the amount of correction in the analog voltage V6 at time t1, the ΔVcom1 can be determined as F1. Similarly, if the unit 10 determines the amount of correction in the analog voltage V6 at one of the times t2 to t7, the ΔVcom1 can be determined as one of F2 to F7. However, the first occurring value F1 of the values F1 to F7 may have an error which is not negligible to use the value F1 as the value of the ΔVcom1, since the value F1 is affected by the voltage on the common electrode 2*c* of the Vd determination mode A occurring immediately before the time t0. Therefore, the first occurring value F1 is neglected. As a result, except for the value F1, any one of the remaining six values F2 to F7 can be used as a value of ΔVcom1. However, in this embodiment, any one of the six values F2 to F7 itself is not used as the value of ΔVcom1, but an average value of the six values F2 to F7 is used as the value of ΔVcom1. By using the average value of the values F2 to F7 as the ΔVcom1, the reliability of the value of ΔVcom1 to be determined can be improved further. It in noted that, for example, an average value of the only values F3, F5 and F7 of the six values F2 to F7 at the rise times t3, t5 and t7 may be used as the value of ΔVcom1, or any one of six values F2 and F7 itself may be used as the value of ΔVcom1, as long as the value of ΔVcom1 is enough reliable. In this way, the ΔVcom1 is determined in the ΔVcom1 determination mode B.

After the ΔVcom1 determination mode B, a ΔVcom2 determination mode C for determining the ΔVcom2 is established as shown in the timing chart of FIG. 7. In the ΔVcom2 determination mode C, it is required to set the TFTs in the liquid crystal panel 2 to the off state. For this purpose, after the ΔVcom1 determination mode B (time t8), the signal generating circuit 31 of the gate driver 3 keeps the voltage of the signal Sig1 the voltage Vp and changes the voltage of the signal Sig2 from the voltage Vp to the negative voltage Vn (see the timing chart of FIG. 7). When the voltage of the signal Sig1 is the Vp and the voltage of the signal Sig2 is the Vn, all output circuits 32*a* (32*b*) output the Voff of the voltages Von and Voff to the corresponding adders 33*a* (33*b*) as the voltages V1 (V2) (see the timing chart of FIG. 7). Further, the signal generating circuit 31 continues to generate a signal Sig3 representing a voltage V3 of amplitude A and supplies all of the adders 33*a* and 33*b* with the signal Sig3. Therefore, each adder 33*a* (33*b*) is supplied with the off-voltage Voff from the output circuit 32*a* (32*b*) and the signal Sig3 from the signal generating circuit 31. The adder 33*a* (33*b*) adds the voltage V3 of the signal Sig3 to the off-voltage Voff to output Voff+V3 as the voltage V4 (V5) (see the timing chart of FIG. 7). The voltage V4 (V5) changes between a minimum voltage Voff and a maximum voltage Voff+A in the ΔVcom2 determination mode C. The voltage V4 (V5) outputted from the adder 33*a* (33*b*) is supplied to the corresponding gate bus G.

In the ΔVcom2 determination mode C, the signal generating circuit 41 of the source driver 4 generates the signal Sig4 for controlling the DAC 42 in such a way that the DAC 42 outputs the zero voltage just as in the case of the ΔVcom1 determination mode B, so that the signal Sig4 is supplied to the DAC 42. The DAC 42 generates the zero voltage in response to the signal Sig4, so that the zero voltage is supplied to each source bus S through the output circuit 43. Therefore, in the ΔVcom2 determination mode C, the changing voltages are supplied to gate buses G and the constant voltages (zero voltage) are supplied to the source buses S. Therefore, on the basis of the equivalent model shown in FIG. 5, an analog voltage V6 determined by a capacitive division is outputted from the common electrode 2*c*. As shown in FIG. 7, the voltages V4 (V5) supplied to the gate buses G change in the ΔVcom2 determination mode C, so that the analog voltage V6 outputted from the common electrode 2*c* also changes accordingly. The amount of change ΔVcom2 in the analog voltage V6 of the ΔVcom2 determination mode C corresponds to the ΔVcom2 of the equation (8). In order to determine the ΔVcom2, the analog voltage V6 is supplied to the corrected voltage generating circuit 7. The analog voltage V6 supplied to the corrected voltage generating circuit 7 is detected at the AD converting circuit 9 through the switch SW4. The AD converting circuit 9 converts the detected analog voltage V6 into a digital signal to supply the digital signal to the MPU 10. The MPU 10 determines the amount of correction ΔVcom2 from the supplied digital signal. The first occurring value F1' in the ΔVcom2 determination mode C may have an error which is not negligible to use the value F1' as the value of the ΔVcom2, since the value F1' is affected by the voltage on the common electrode 2*c* of the ΔVcom1 determination mode B occurring immediately before the time t8. Therefore, the first occurring value F1' is neglected and, except for the value F1', an average value of the remaining six values F2' to F7' is used as the value of ΔVcom2. In this way, the ΔVcom2 is determined in the ΔVcom2 determination mode C.

After the ΔVcom2 determination mode C, a ΔVcom3 determination mode D is established as shown in the timing chart of FIG. 7. In the ΔVcom3 determination mode D, half of the TFTs in the liquid crystal panel 2 are set to the on state and the remaining half are set to the on state. For this purpose, after the ΔVcom2 determination mode C (time t9), the signal generating circuit 31 of the gate driver 3 changes the voltage of the signal Sig1 from the voltage Vp to the voltage Vn and changes the voltage of the signal Sig2 from the voltage Vn to the voltage Vp. When the voltage of the signal Sig1 is the Vn and the voltage of the signal Sig2 is the Vp, half of all output circuits in the gate driver 3 output the on-voltage Von to the corresponding adders, but the remaining half output the off-voltage Voff to the corresponding adders. For the sake of convenience, assume that the output circuit 32*a* in FIG. 6 outputs the on-voltage Von to the corresponding adder 33*a* and the output circuit 32*b* in FIG. 6 outputs the off-voltage Voff to the corresponding adder 33*b*. Further, the signal generating circuit 31 continues to generate the signal Sig3 representing a voltage V3 of amplitude A and supplies the signal Sig3 to all of the adders 33*a* and 33*b*. Therefore, each adder 33*a* is supplied with the on-voltage Von from the output circuit 32*a* and the signal Sig3 from the signal generating circuit 31, but each adder 33*b* is supplied with the off-voltage Voff from the output circuit 32*b* and the signal Sig3 from the signal generating circuit 31. Therefore, each adder 33*a* outputs the voltage V4 which changes between a minimum voltage Von and a maximum voltage Von+A, but each adder 33*b* outputs the voltage V5 which changes between a minimum voltage Voff and a maximum voltage Voff+A. The voltages V4 outputted from the adders 33*a* are supplied to half of n gate buses G and the voltages V5 outputted from the adders 33*b* are supplied to the remaining half of n gate buses G. Therefore, in the ΔVcom3 determination mode, the TFTs supplied to the voltage V4 are kept the on state and the TFTs supplied to the voltage V5 are kept to the off state.

In the ΔVcom3 determination mode D, the signal generating circuit 41 of the source driver 4 generates the signal Sig4 for controlling the DAC 42 in such a way that the DAC 42 outputs the zero voltage just as in the case of the ΔVcom1 determination mode B and the ΔVcom2 determination mode C, so that the signal Sig4 is supplied to the DAC 42. The DAC 42 generates the zero voltage in response to the signal Sig4, so that the zero voltage is supplied to each source bus S. Therefore, in the ΔVcom3 determination mode D, the voltages V4 changing between the minimum voltage Von and the maximum voltage Von+A are supplied to n/2 gate buses G and the voltages V5 changing between the minimum voltage Voff and the maximum voltage Voff+A are supplied to the remaining n/2 gate buses G, on the other hand, the constant voltages (zero voltage) are supplied to the source buses S. Therefore, on the basis of the equivalent model shown in FIG. 3, an analog voltage V6 determined by a capacitive division is outputted from the common electrode 2*c*. Since the TFTs supplied with the voltages from the n/2 of n gate buses G are set to the on state and the TFTs supplied with the voltages from the remaining n/2 are set to the off state, the analog voltage V6 can be determined by substituting n/2 for m in FIG. 3. As shown in FIG. 7, the voltages V4 and V5 supplied to the gate buses G change in the ΔVcom3 determination mode D, so that the analog voltage V6 outputted from the common electrode 2*c* changes accordingly. The amount of change ΔVcom3 in the analog voltage V6 of the ΔVcom3 determination mode D corresponds to the ΔVcom3 of the equation (8). In order to determine the ΔVcom3, the analog voltage V6 is supplied to the corrected voltage generating circuit 7. The analog voltage V6 supplied to the corrected voltage generating circuit 7 is detected at the AD converting circuit 9 through the switch SW4. The AD converting circuit 9 converts the detected analog voltage V6 into a digital signal to supply the MPU 10 with the digital signal. The MPU 10 determines the amount of correction ΔVcom3 from the supplied digital signal. The first occurring value F1" in the ΔVcom3 determination mode D may have an error which is not negligible to use the value F1" as the value of the ΔVcom3, since the value F1" is affected by the voltage on the common electrode 2c of the ΔVcom2 determination mode C occurring immediately before the time t9. Therefore, the first occurring value F1" is neglected and, except for the value F1", an average value of the remaining six values F2''' to F7" is used as the value of ΔVcom3. In this way, the ΔVcom3 is determined in the ΔVcom3 determination mode D.

Through the Vd determination mode A, the ΔVcom1 determination mode B, the ΔVcom2 determination mode C and the ΔVcom3 determination mode D, the four values Vd, ΔVcom1, Δ Vcom2, and ΔVcom3 of the five values Vd, ΔVg, ΔVcom1, Δ Vcom2 and ΔVcom3 needed to determine the amount of correction can be determined. Since the remaining value ΔVg is the amount of change in the voltage V4 (V5) supplied to the gate bus G (i.e. the amplitude A of the signal Sig3), it is possible to know the ΔVg by, for example, supplying the MPU 10 with the voltage V4. However, in this embodiment, the value of the ΔVg has been stored in the MPU 10 as a default value in advance, so that the amount of correction ΔVcom is determined by substituting the four values Vd, ΔVcom1, Δ Vcom2, and ΔVcom3 into the equation (8). Further, the ΔVg has been stored in the MPU 10 as the default value in advance, but alternatively the ΔVg may be determined by supplying the MPU 10 with the voltage V4 or the signal Sig3. Furthermore, the Vd is determined using the on-voltage Von and the off-voltage Voff from the power supply 5, but the Vd may be stored in the MPU 10 as a default value in advance.

After determining the ΔVcom, the MPU 10 corrects the common electrode voltage Vcom by the determined amount of correction ΔVcom to determine the corrected common electrode voltage Vcom' and supplies the DA converting circuit 11 with a digital signal Sig5 representing the corrected common electrode voltage Vcom'. The DA converting circuit 11 converts the supplied digital signal Sig5 into an analog voltage representing the corrected common electrode voltage Vcom'.

After determining the corrected common electrode voltage Vcom', the MPU 10 outputs to the control circuit 6 a signal Sig6 meaning that the corrected common electrode voltage Vcom' has been determined. After the control circuit 6 receives the signal Sig6, the control circuit 6 controls the switches SW2 and SW3 in such a way that the switches SW2 and SW3 are opened. As soon as the switches SW2 and SW3 are opened, the source driver 4 stops generating the signal Sig4 and the gate driver 3 stops generating the signals Sig1 to Sig3, so that the correction mode is finished. Further, when the control circuit 6 receives the signal Sig6, the control circuit 6 controls the switch SW4 in such a way that the switch SW4 is closed from the terminal 8 side to the terminal 12 side. Therefore, the corrected common electrode voltage Vcom' which has been converted into the analog voltage by the DA converting circuit 11 is supplied to the common electrode 2c through the switch SW4, so that the mobile phone 1 is shifted to a normal mode for displaying the image on the liquid crystal panel 2.

In this embodiment, the ΔVg of the five terms Vd, ΔVg, ΔVcom1, ΔVcom2, and ΔVcom3 needed to determine the amount of correction ΔVcom is stored in the MPU 10 in advance. Further, the Vd of the other four terms Vd, ΔVcom1, Δ Vcom2, and ΔVcom3 is determined on the basis of the on-voltage Von and the off-voltage Voff outputted from the power supply 5, and the remaining three terms ΔVcom1, Δ Vcom2 and ΔVcom3 are determined on the basis of the voltage V6 on the common electrode 2c when the voltages V4 (V5) from the gate driver 3 are supplied to the gate buses G and the zero voltages are supplied to the source buses S. Therefore, when the amount of correction ΔVcom is determined, the equipment comprising photo sensors for receiving light from the panel and the adjustment system for manipulating the adjustment knob is not required, so that the correction can be achieved without the expensive equipment cost.

In the embodiment, the corrected common electrode voltage Vcom' is determined by correcting the pre-correction common electrode voltage Vcom by the amount of correction ΔVcom determined as described above. Therefore, the variable resistor for correcting the common electrode voltage Vcom and the adjustment knob for changing the resistance value of the variable resistor are not required, so that the component cost are reduced.

In the embodiment, since the corrected common electrode voltage Vcom' is determined by correcting the common electrode voltage Vcom by the amount of correction ΔVcom, the corrected common electrode voltage Vcom' is uniquely determined on the basis of the determined amount of correction ΔVcom. In the case of prior art, there is a fear that when the variable resistor is adjusted the voltage level of the common electrode deviates from the optimum level by slightly changing the position of the adjustment knob immediately after the person or machine releases the adjustment knob, but in the case of the embodiment, the deviation of the corrected common electrode voltage Vcom' can be prevented since the adjustment knob is not required and the corrected common electrode voltage Vcom' is uniquely determined on the basis of the determined amount of correction ΔVcom.

In the embodiment, a combination of the all-on state, the all-off state, and the on-off mixed state has been considered in order to derive the equation (8) of the amount of correction ΔVcom (the all-on state means that the voltages Von+V3 are supplied to all of n gate buses G, the all-off state means that the voltages Voff+V3 are supplied to all of n gate buses G, and the on-off mixed state means that the voltages Von+V3 are supplied half of the n gate buses G and the voltages Voff+V3 are supplied to the remaining gate buses G). However, the present invention is not limited to this combination, and the equation for determining the amount of correction ΔVcom can be expressed by an equation other than the equation (8) if a combination of three or more voltage supplying states having different ratios (m:n−m) is considered ('m' stands for the number of the gate buses supplied with the on-voltage Von+V3 and 'n−m' stands for the number of the gate buses supplied with the off-voltage Voff+V3). For example, if four voltage supplying states in which the ratios (m; n−m) are 1:1, 1:2, 1:3 and 1:4 respectively are considered, it is possible to express the amount of correction ΔVcom as functions of four amounts of change ΔVcom1', ΔVcom2', ΔVcom3' and ΔVcom4' (where the ΔVcom1', ΔVcom2', ΔVcom3' and ΔVcom4' are amounts of change in the voltages on the common electrode 2c under the condition of the four voltage supplying states respectively). Therefore, if the ΔVcom expressed as the functions of the four amounts of change ΔVcom1', ΔVcom2', ΔVcom3' and ΔVcom4' is used, the ΔVcom1', ΔVcom2', ΔVcom3' and ΔVcom4' can be determined by controlling the gate driver 3 in such a way that the four voltage supplying states of the ratios 1:1, 1:2, 1:3 and 1:4 are established, so that the amount of correction ΔVcom can be determined.

The ΔVcom1 determination mode, ΔVcom2 determination mode, and ΔVcom3 determination mode are established in the order of determination modes B, C, and D in this embodiment, but may be established in any order.

The Vd determination mode A is established before the ΔVcom 1 determination mode B, ΔVcom2 determination mode C, and ΔVcom3 determination mode D are established. However, the Vd determination mode A may be established after the ΔVcom1determination mode B, ΔVcom2 determination mode C, and ΔVcom3 determination mode D are established. Further, the Vd determination mode A may be established between the ΔVcom1determination mode B and the ΔVcom2 determination mode C or between the ΔVcom2 determination mode C and the ΔVcom3 determination mode D. Furthermore, it is possible to establish the Vd determination mode A in parallel with the ΔVcom 1 determination mode B, the ΔVcom2 determination mode C, or the ΔVcom3 determination mode D.

Figure 8:
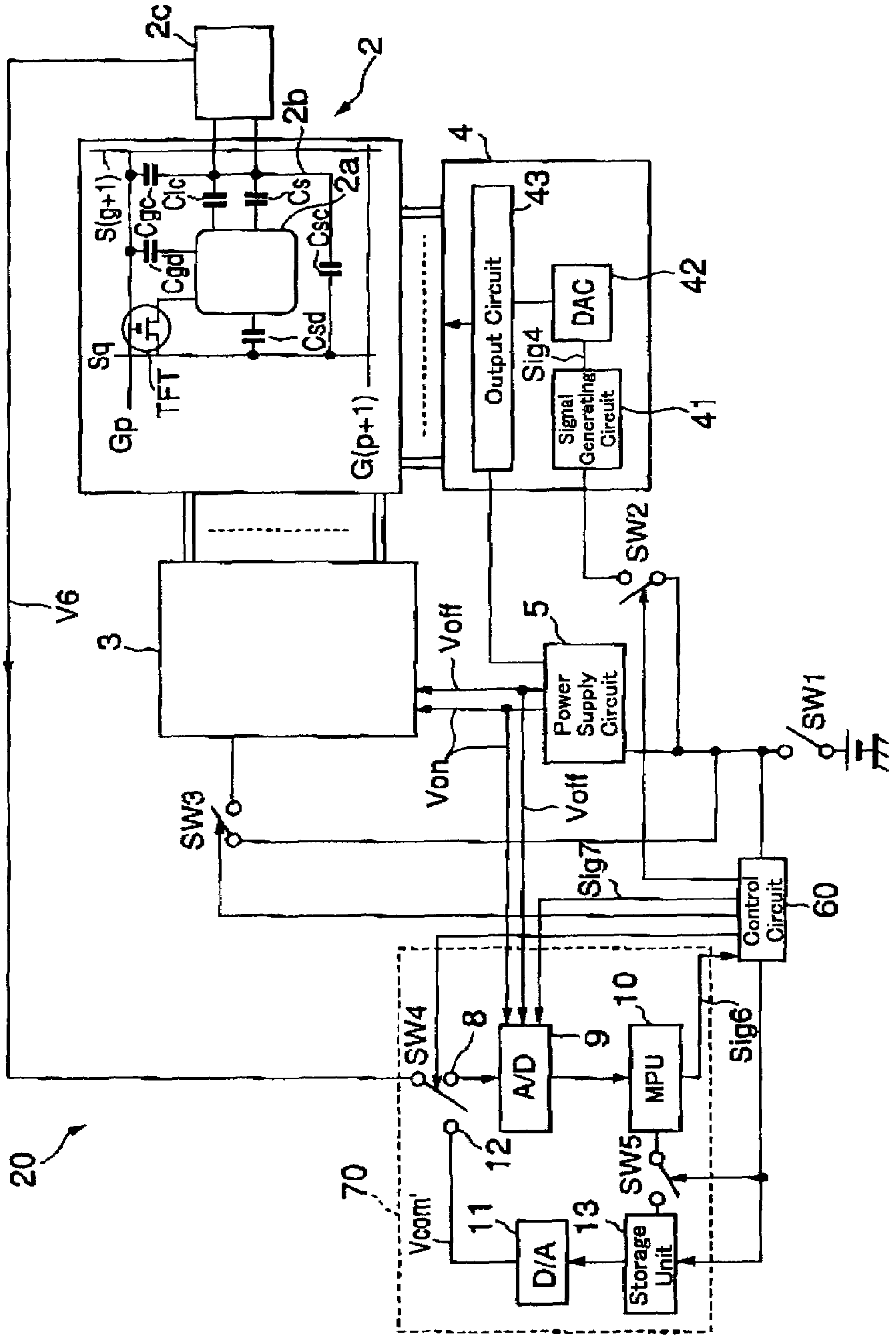
FIG. 8 is a block diagram of a mobile phone 20 which is one example of the image display device of a second embodiment according to the present invention.

FIG. 8 is a block diagram of a mobile phone 20 which is one example of the image display device of a second embodiment according to the present invention. The description of FIG. 8, in which the same composing elements as FIG. 1 are identified by the same reference numerals as FIG. 1, is mainly made about the different points from FIG. 1.

The main different points between FIG. 8 and FIG. 1 are that the constitution of the corrected voltage generating circuit 70 of FIG. 8 is different from the constitution of the corrected voltage generating circuit 7 of FIG. 1, and that, in FIG. 1, the common electrode voltage Vcom is corrected each time the power supply of the mobile phone 1 is turned on whereas in FIG. 8 the common electrode voltage Vcom is corrected periodically (for example, once a month). Hereinafter, the operation of the mobile phone 20 shown in FIG. 8 is described while clarifying the difference points from the mobile phone 1 of FIG. 1.

The corrected voltage generating circuit 70 comprises a switch SW5 and a storage unit 13, in addition to the AD converting circuit 9, the MPU 10 and the DA converting circuit 11. The mobile phone 20 provided with such corrected voltage generating circuit 70 establishes, periodically (for example, once a month), a correction mode for correcting the common electrode voltage when the mobile phone 20 is in a standby status. In the correction mode, the control circuit 60 supplies the AD converting circuit 9 with a signal Sig7 for controlling the AD converting circuit 9 in such a way that the AD converting circuit 9 outputs digital signals representing the on-voltage Von and the off-voltage Voff to the MPU 10. When the signal Sig7 is supplied, the digital signals representing the on-voltage Von and the off-voltage Voff are outputted from the AD converting circuit 9 to the MPU 10, the MPU 10 determines the Vd in the manner described with reference to FIG. 7 and stores the determined Vd. Next, the MPU 10 determines the ΔVcom1, Δ Vcom2, and ΔVcom3 in the manner described with reference to FIG. 7, determines the amount of correction ΔVcom by substituting the determined ΔVcom1, ΔVcom2, and ΔVcom3 into the equation (8), and determines the common electrode voltage Vcom' which has been corrected by the determined amount of correction ΔVcom. Further, the MPU 10 supplies the control circuit 60 with the signal Sig6 meaning that the corrected common electrode voltage Vcom' has been determined. When the control circuit 60 receives the signal Sig6, the switch SW5 is closed, so that the corrected common electrode voltage Vcom' is stored in the storage unit 13 from the MPU 10 through the switch SW5. After the corrected common electrode voltage Vcom' is stored in the storage unit 13, the control circuit 60 controls the switches SW2, SW3, SW4, and SW5 in such a way that the switch SW4 is closed at the side of the terminal 12 and the switches SW2, SW3 and SW5 are opened, so that the correction mode is finished. After finishing the correction mode, the corrected common electrode voltage Vcom' is read from the storage unit 13 by the control circuit 60. The read corrected common electrode voltage Vcom' is converted into an analog voltage by the DA converting circuit 11 and supplied to the common electrode 2*c* through the switch SW4, so that the mobile phone 20 is shifted to the normal mode.

As shown in FIG. 8, the corrected common electrode voltage Vcom' may be read from the storage unit 13 to supply the common electrode 2*c* with the corrected common electrode voltage Vcom'. When the mobile phone 20 determines the amount of correction ΔVcom, the mobile phone 20 dose not require the equipment comprising photo sensors for receiving light from the panel and the adjustment system for manipulating the adjustment knob just as in the case of the mobile phone 1 shown in FIG. 1, so that the correction can be achieved without the expensive equipment cost.

The mobile phone 20 shown in FIG. 8 is in no need of the variable resistor for correcting the common electrode voltage Vcom and the adjustment knob for changing the resistance value of the variable resistor just as in the case of the mobile phone 1 shown in FIG. 1, so that the component cost are reduced. Further, since the common electrode voltage is corrected without the adjustment knob, the corrected common electrode voltage Vcom' can be prevented from deviating from the optimum level. Furthermore, in FIG. 8, the gate buses G are supplied with the changing voltages Von+V3 or Voff+V3 in such a way that the all-on state, all-off state and on-off mixed state are established in the ΔVcom1, Δ Vcom2, and ΔVcom3 determination modes B, C, and D respectively to determine the amount of correction ΔVcom just as in the case of FIG. 1, but the amount of correction ΔVcom can be determined using a combination of at least three voltage supplying states other than the combination of the all-on state, all-off state and on-off mixed state.

In FIG. 8, the signal representing the corrected common electrode voltage Vcom' outputted from the MPU 10 is only supplied to the storage unit 13, but the signal may be supplied to not only the storage unit 13 but also the DA converting circuit 11. In the case, the corrected voltage generating circuit can be constituted so as to provide with functions of both the corrected voltage generating circuit 7 shown in FIG. 1 and the corrected voltage generating circuit 70 shown in FIG. 8, so that it is possible to establish the better correction mode.

Figure 9:
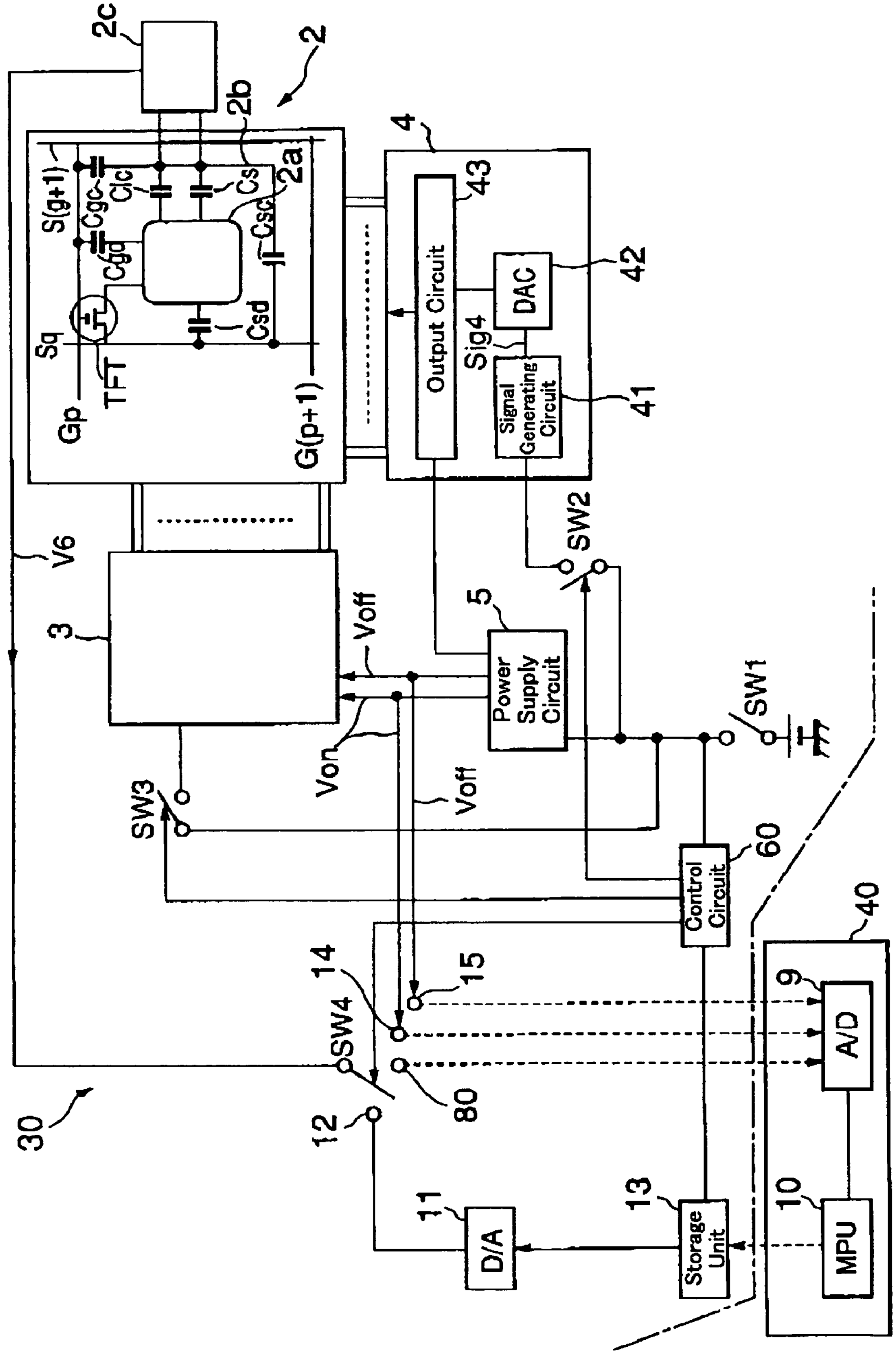
FIG. 9 is a block diagram of a mobile phone 30 which is one example of the image display device of third embodiment according to the present invention and a corrected voltage determining device 40 which is prepared as a different device from the mobile phone 30.

FIG. 9 is a block diagram of a mobile phone 30 which is one example of the image display device of third embodiment according to the present invention and a corrected voltage determining device 40 which is prepared as a different device from the mobile phone 30. The description of FIG. 9, in which the same composing elements as FIG. 1 are identified by the same reference numerals as FIG. 1, is mainly made about the different points from FIG. 1.

The main different points between FIG. 9 and FIG. 1 are that the mobile phone 1 in FIG. 1 is provided with the AD converting circuit 9 and the MPU 10 whereas the mobile phone 30 in FIG. 9 is not provided with the AD converting circuit 9 and the MPU 10, and that, in FIG. 1, the common electrode voltage Vcom is corrected each time when the power supply of the mobile phone 1 is turned on, whereas in FIG. 9 the common electrode voltage Vcom is corrected before the mobile phone 30 is shipped as a product.

In FIG. 9, the common electrode voltage Vcom is corrected before the mobile phone 1 is shipped as the product. For this purpose, a corrected voltage determining device 40 for determining a corrected common electrode voltage Vcom' is prepared in addition to the mobile phone 30. The corrected voltage determining device 40 is provided with a AD converting circuit 9 and a MPU 10. When the common electrode voltage Vcom is corrected, the mobile phone 30 is connected to the corrected voltage determining device 40 before the mobile phone 30 is shipped as the product. By this connection, a power supply circuit 5 of the mobile phone 30 is connected to the AD converting circuit 9 of the corrected voltage determining device 40 through the detection terminals 14 and 15, and a detection terminal 80 of the mobile phone 30 is connected to the AD converting circuit 9 of the corrected voltage determining device 40, and further, a storage unit 13 of the mobile phone 30 is connected to the MPU 10 of the corrected voltage determining device 40.

After the mobile phone 30 is connected to the corrected voltage determining device 40 as described above, the on-voltage Von and the off-voltage Voff from the power supply circuit 5 are detected at the detection terminals 14 and 15, the detected on-voltage Von and off-voltage Voff are converted into digital signals by the AD converting circuit 9 of the corrected voltage determining device 40 and supplied to the MPU 10. The MPU 10 determines the Vd from the supplied digital signals and stores the Vd. Subsequently, the voltage V6 from the common electrode 2*c* is detected at the detection terminal 80 and supplied to the corrected voltage determining device 40. The voltage V6 supplied to the corrected voltage determining device 40 is converted into a digital signal by the AD converting circuit 9 and supplied to the MPU 10. The MPU 10 determines the ΔVcom1, Δ Vcom2, and ΔVcom3 in order in a manner described with reference to FIG. 7. The MPU 10 determines the amount of correction ΔVcom by substituting the determined Vd, ΔVcom1, ΔVcom2 and ΔVcom3 into the equation (8), and determines the common electrode voltage Vcom' which has been corrected by the determined amount of correction ΔVcom. After the MPU 10 determines the corrected common electrode voltage Vcom', the MPU 10 outputs the corrected common electrode voltage Vcom' to the storage unit 13 of the mobile phone 30. In this way, the corrected common electrode voltage Vcom' is stored in the storage unit 13 of the mobile phone 30. After the corrected common electrode voltage Vcom' is stored in the storage unit 13, the mobile phone 30 is disconnected to the corrected voltage determining device 40. After the corrected common electrode voltage Vcom' is stored in the storage unit 13 of the mobile phone 30 in the manner described above, the mobile phone 30 is shipped.

In the case of the mobile phone 30 which has stored the corrected common electrode voltage Vcom', when the user turns on the power supply of the mobile phone 30, the switch SW1 is closed. After the switch SW1 is closed, the control circuit 60 controls in such a way that the switches SW2 and SW3 are opened and the switch SW4 is closed at the side of the terminal 12. Further, the corrected common electrode voltage Vcom' is read from the storage unit 13 by the control circuit 60. The read corrected common electrode voltage Vcom' is converted into an analog voltage by the DA converting circuit 11 and supplied to the common electrode 2*c* through the switch SW4, so that the image is displayed on the liquid crystal panel 2.

The mobile phone 30 shown in FIG. 9 has an advantage of the smaller size than the mobile phone 1 shown in FIG. 1 since the AD converting circuit 9 and the MPU 10 become unnecessary.

The mobile phone 30 shown in FIG. 9 is in no need of the variable resistor for correcting the common electrode voltage Vcom and the adjustment knob for changing the resistance value of the variable resistor just as in the case of the mobile phone 1 shown in FIG. 1, so that the component cost are reduced. Further, since the common electrode voltage is corrected without the adjustment knob, the corrected common electrode voltage Vcom' can be prevented from deviating from the optimum level. Furthermore, in FIG. 9, the gate buses G are supplied with the changing voltages Von+V3 or Voff+V3 in such a way that the all-on state, all-off state and on-off mixed state are established in the ΔVcom1, Δ Vcom2, and ΔVcom3 determination modes B, C, and D respectively to determine the amount of correction ΔVcom just as in the case of FIG. 1, but the amount of correction ΔVcom can be determined using a combination of at least three voltage supplying states other than the combination of the all-on state, all-off state and on-off mixed state.

In FIG. 9, not only the mobile phone 30 but also the corrected voltage determining device 40 are required in order to determine the corrected common electrode voltage Vcom', but the AD converting circuit 9 and the MPU 10 of the corrected voltage determining device 40 can be implemented without large-scale devices. Therefore, the expensive equipment comprising photo sensors for receiving light from the liquid crystal panel 2 and the adjustment system for manipulating the adjustment knob becomes unnecessary, so that the correction can be achieved at a lower equipment cost than the prior art.

The mobile phones are taken up as the image display device according to the present invention in the first to third embodiments, but the present invention can be also applied to the image display device other than a mobile phone (for example, a personal computer).

In the first, second and third embodiments, all of n gate buses G are supplied with the changing voltage Von+V3 to determine the amount of change ΔVcom1 in the voltage on the common electrode 2*c* in the ΔVcom1 determination mode B, but one or more gate buses G of n gate buses G are not needed to be supplied with the changing voltage Von+V3 if the amount of change ΔVcom1 is determined accurately. Similarly, all of n gate buses G are supplied with the changing voltage Voff+V3 to determine the amount of change ΔVcom2 in the voltage on the common electrode 2*c* in the ΔVcom2 determination mode C, but one or more gate buses G of n gate buses G are not needed to be supplied with the changing voltage Voff+V3 if the amount of change ΔVcom2 is determined accurately. Further, half of n gate buses G are supplied with the changing voltage Von+V3 and the remaining half are supplied with the changing voltage Voff+V3 to determine the amount of change ΔVcom3 in the voltage on the common electrode 2*c* in the ΔVcom3 determination mode D, but one or more gate buses G of n gate buses G are not needed to be supplied with the changing voltage Von+V3 or Voff+V3 if the amount of change ΔVcom3 is determined accurately.

According to the image display device of the present invention, the component cost and the equipment cost are reduced and a voltage level of a common electrode is easily adjustable to an optimum level.

The invention claimed is:

1. An image display device comprising a plurality of gate buses, a plurality of source buses, transistors each of which for supplying a pixel electrode with a voltage from said source bus, a common electrode, and a corrected voltage supplying means for supplying said common electrode with a common electrode voltage which has been corrected by an amount of correction, wherein said corrected voltage supplying means comprising:

a changing voltage generating means for generating a first changing voltage having changing voltage levels for setting said transistor to an on-state and a second changing voltage having changing voltage levels for setting said transistor to an off-state, said changing voltage generating means operating so as to establish at least three supply modes including a first supply mode, a second supply mode and a third supply mode, said first supply mode in which said first changing voltage is supplied to a first number of ones of said plurality of gate buses and said second changing voltage is supplied to a second number of ones of said plurality of gate buses, said second supply mode in which said first changing voltage is supplied to a third number of ones of said plurality of gate buses and said second changing voltage is supplied to a fourth number of ones of said plurality of gate buses or said first changing voltage is supplied to at least said third number of ones of said plurality of gate buses and said second changing voltage is not supplied to said plurality of gate buses, and said third supply mode in which said first changing voltage is supplied to a fifth number of ones of said plurality of gate buses and said second changing voltage is supplied to a sixth number of ones of said plurality of gate buses or said first changing voltage is not supplied to said plurality of gate buses and said second changing voltage is supplied to at least said sixth number of ones of said plurality of gate buses; and a corrected voltage generating means for detecting, each time each of said at least three modes is established, a voltage on said common electrode to determine said amount of correction on the basis of amounts of change in said detected voltages on said common electrode;

wherein said at least three supply modes consists of only said first, second and third supply modes, wherein said second supply mode is a mode in which said first changing voltage is supplied to all of said plurality of gate buses, and wherein said third supply mode is a mode in which said second changing voltage is supplied to all of said plurality of gate buses.

2. An image display device as claimed in claim 1, wherein said corrected voltage generating means comprises:

an AD converting means for detecting, each time each of said at least three modes is established, said voltage on said common electrode as an analog voltage to convert said detected analog voltages into first digital signals;

an operation means for determining amounts of change in said detected analog voltages from said first digital signals and determining said amount of correction on the basis of said determined amounts of change to output an digital signal representing said common electrode voltage which has been corrected by said determined amount of correction;

a DA converting means for converting said digital signal outputted from said operation means into an analog voltage, and a switching means for switching between a first connection mode in which said common electrode is connected to said AD converting means and a second connection mode in which said common electrode is connected to said DA converting means.

3. A image display device as claimed in claim 2, wherein said corrected voltage generating means comprises a storing means for storing said corrected common electrode voltage represented by said digital signal outputted from said operation means, and wherein said DA converting means converts said corrected common electrode voltage stored in said storing means into an analog voltage, instead of converting said digital signal outputted from said operation means into an analog voltage.

4. An image display device as claimed in claim 1, wherein said corrected voltage supplying means comprises a predetermined voltage generating means for generating a predetermined voltage to supply said source bus with said predetermined voltage, and wherein said plurality of source buses are supplied with said predetermined voltage in each of said at least three supply modes.

5. An image display device as claimed in claim 4, wherein said predetermined voltage generating means generates a constant voltage as said predetermined voltage.

6. An image display device as claimed in claim 1, wherein said changing voltage generating means comprises:

a plurality of output circuits, each of which provided for a respective one of said plurality of gate buses, for selectively outputting an on-voltage of a constant value for setting said transistor to an on-state and an off-voltage of a constant value for setting said transistor to an off-state;

a signal generating circuits for generating a changing voltage signal which represents a predetermined changing voltage; and a plurality of adders, each of which provided for a respective one of said output circuits, for adding said predetermined changing voltage to said on-voltage when said on-voltage is outputted from the corresponding output circuit to output said first changing voltage, and for adding said predetermined changing voltage to said off-voltage when said off-voltage is outputted from the corresponding output circuit to output said second changing voltage.

7. An image display device as claimed in claim 2, wherein said AD converting means detects said on-voltage and said off-voltage as an analog voltage and converts said detected analog voltage into a second digital signal, and wherein said operation means determines said amounts of change from said first digital signal and values of said on-voltage and said off-voltage from said second digital signal, and determines said amount of correction on the basis of said determined amounts of change and said determined values of said on-voltage and said off-voltage.

8. An image display device as claimed in claim 1, wherein said changing voltage generating means operates so as to establish said at least three supply modes when a power supply of said image display device is turned from off to on.

9. An image display device as claimed in claim 1, wherein said changing voltage generating means operates so as to periodically establish said at least three supply modes under e the condition that an power supply of said image display device is in an on-state.

10. An image display device comprising a plurality of gate buses, a plurality of source buses, transistors each of which for supplying a pixel electrode with a voltage from said source bus, a common electrode, and a corrected voltage supplying means for supplying said common electrode with a common electrode voltage which has been corrected by an amount of correction, wherein said corrected voltage supplying means comprising:

a changing voltage generating means for generating a first changing voltage having changing voltage levels for setting said transistor to an on-state and a second changing voltage having changing voltage levels for setting said transistor to an off-state, said changing voltage generating means operating so as to establish at least three supply modes including a first supply mode, a second supply mode and a third supply mode, said first supply mode in which said first changing voltage is supplied to a first number of ones of said plurality of gate buses and said second changing voltage is supplied to a second number of ones of said plurality of gate buses, said second supply mode in which said first changing voltage is supplied to a third number of ones of said plurality of gate buses and said second changing voltage is supplied to a fourth number of ones of said plurality of gate buses or said first changing voltage is supplied to at least said third number of ones of said plurality of gate buses and said second changing voltage is not supplied to said plurality of gate buses, and said third supply mode in which said first changing voltage is supplied to a fifth number of ones of said plurality of gate buses and said second changing voltage is supplied to a sixth number of ones of said plurality of gate buses or said first changing voltage is not supplied to said plurality of gate buses and said second changing voltage is supplied to at least said sixth number of ones of said plurality of gate buses;

a first detection terminal for detecting a voltage on said common electrode each time each of said at least three modes is established;

a storing means for storing said corrected con-imon electrode voltage which is determined on the basis of amounts of change in said detected voltages on said common electrode through said first detection terminal; and a DA converting means supplied with said corrected common electrode voltage stored in said storing means as a digital signal, said DA converting means converting said supplied digital signal into an analog voltage and outputting said analog voltage to said common electrode;

wherein said at least three supply modes consists of only said first, second and third supply modes, wherein said second supply mode is a mode in which said first changing voltage is supplied to all of said plurality of gate buses, and wherein said third supply mode is a mode in which said second changing voltage is supplied to all of said plurality of gate buses.

11. An image display device as claimed in claim 10, wherein said corrected voltage generating means comprises an switching means for switch between a first connection mode in which said common electrode is connected to said first detection terminal and a second connection mode in which said common electrode is connected to said DA converting means.

12. An image display device as claimed in claim 10, wherein said corrected voltage supplying means comprises a predetermined voltage generating means for generating a predetermined voltage to supply said source bus with said predetermined voltage, and wherein said plurality of source buses are supplied with said predetermined voltage in each of said at least three supply modes.

13. An image display device as claimed in claim 12, wherein said predetermined voltage generating means generates a constant voltage as said predetermined voltage.

14. An image display device as claimed in claim 10, wherein said changing voltage generating means comprises:

a plurality of output circuits, each of which provided for a respective one of said plurality of gate buses, for selectively outputting an on-voltage of a constant value for setting said transistor to an on-state and an off-voltage of a constant value for setting said transistor to an off- state;

a signal generating circuits for generating a changing voltage signal which represents a predetermined changing voltage; and a plurality of adders, each of which provided for a respective one of said output circuits, for adding said predetermined changing voltage to said on-voltage when said on-voltage is outputted from the corresponding output circuit to output said first changing voltage, and for adding said predetermined changing voltage to said off-voltage when said off-voltage is outputted from the corresponding output circuit to output said second changing voltage.

15. An image display device as claimed in claim 14, wherein said corrected voltage supplying means comprises a second detection terminal for detecting said on-voltage and a third detection terminal for detecting said off-voltage, and wherein said storing means stores said corrected common electrode voltage which is determined on the basis of said amounts of change in said detected voltages on said common electrode through said first detection terminal, a value of said detected on-voltage through said second detection terminal, and a value of said detected off-voltage through said third detection terminal.

* * * * *